(12) United States Patent
Faulk

(10) Patent No.: US 7,207,487 B2
(45) Date of Patent: Apr. 24, 2007

(54) METHOD AND SYSTEM FOR ELECTRONIC SOLICITATION OF VOTES AFFECTING CORPORATE AFFAIRS

(75) Inventor: Anne O. Faulk, Atlanta, GA (US)

(73) Assignee: Swingvote, Inc., Atlanta, GA (US)

( * ) Notice: Subject to any disclaimer, the term of this patent is extended or adjusted under 35 U.S.C. 154(b) by 62 days.

(21) Appl. No.: 11/189,261

(22) Filed: Jul. 26, 2005

(65) Prior Publication Data

US 2006/0016887 A1  Jan. 26, 2006

Related U.S. Application Data

(60) Provisional application No. 60/591,248, filed on Jul. 26, 2004.

(51) Int. Cl.
*G06F 17/60* (2006.01)
(52) U.S. Cl. .................................. 235/386; 235/382.5
(58) Field of Classification Search ................ 235/386, 235/385, 382, 382.5; 705/10, 12
See application file for complete search history.

(56) References Cited

U.S. PATENT DOCUMENTS

2001/0034680 A1* 10/2001 Purcell ........................ 705/35
2001/0037234 A1* 11/2001 Parmasad et al. ............. 705/12
2006/0095376 A1* 5/2006 Mitchell et al. .............. 705/50

FOREIGN PATENT DOCUMENTS

FR        2855630        * 3/2004

* cited by examiner

*Primary Examiner*—Daniel Stcyr
(74) *Attorney, Agent, or Firm*—Womble, Carlyle, Sandridge & Rice, PLLC

(57) ABSTRACT

A method, system, and program product for the electronic delivery and distribution of a solicitation for votes on shareholder issues from an issuer to a plurality of voters. The method includes creating an electronic solicitation message for the issuer; tagging the electronic solicitation message with at least one parameter to ensure the electronic solicitation message is available to the voters holding a shareholder position with the issuer; presenting the electronic solicitation message to the voters; recording and compiling a plurality of information regarding each viewing of the transmitted solicitation message; aggregating a plurality of electronic voting results from the voters; and reporting the aggregated electronic voting results to the issuer.

22 Claims, 8 Drawing Sheets

| | | | | WELCOME JOHN DOE | LOG OUT |
| | | | | ✉ YOU HAVE 35 UNREAD MESSAGES |

| VOTING | REPORTS | MESSAGE BOARD | MAINTENANCE | CONTACT US |

Ballot Issuer: UVW CORPORATION

| CUSIP (9 digit): | 00184A201 | CLASS OF STOCK: | LMCN-V COMMON | TICKER | UVW |
|---|---|---|---|---|---|
| Meeting Date: | 05/16/2003 | RECORD DATE: | 03/20/2003 | CUT-OFF DATE | 05/15/2003 |
| Meeting Time: | 10:00 AM LOCAL | MEETING LOCATION | LANSDOWNE, VA | % OF OUTSTANDING SHARES | 0.146% |
| Outstanding Shares: | 171,185,826.00 | TOTAL BALLOT SHARES: | 250,000.00 | | |

VIEW: ANNUAL REPORT | PROXY STATEMENT | COMPANY WEBSITE | ISSUER MESSAGE — 82

PROPOSAL 1: ELECTION OF DIRECTORS

SPEEDVOTE: | "FOR" ALL NOMINEES | "WITHHOLD" ALL NOMINEES |

| RECCOMENDATION/ANALYSIS | | VOTE | | | |
|---|---|---|---|---|---|
| IRRC | GLASS LEWIS | FOR | WITHHOLD | NOMINEE | COMMENTS |
| VIEW | FOR | ● | ○ | JAMES L. BARKSDALE | VIEW |
| VIEW | FOR | ○ | ● | STEPHEN F. BOLLENBACH | ADD |
| VIEW | FOR | ○ | ● | STEPHEN M. CASE | VIEW |
| VIEW | FOR | ● | ○ | FRANK J. CAUFIELD | ADD |
| VIEW | FOR | ● | ○ | MILES R. GILBURNE | ADD |

METHOD AND SYSTEM FOR ELECTRONIC SOLICITATION OF VOTES AFFECTING CORPORATE AFFAIRS

CROSS-REFERENCE TO RELATED APPLICATIONS

The present patent application is a formalization of a previously filed, co-pending provisional patent application entitled "Method and System for Electronic Solicitation of Votes Affecting Corporate Affairs," filed on Jul. 26, 2004 as U.S. patent application Ser. No. 60/591,248, by the inventor named in this patent application. This patent application claims the benefit of the filing date of the cited provisional patent application according to the statutes and rules governing provisional patent applications, particularly 35 USC § 119 (e)(1) and 37 CFR §§ 1.78(a)(4) and (a)(5). The specification and drawings of the provisional patent application are specifically incorporated herein by reference.

BACKGROUND OF THE INVENTION

The present invention relates generally to the solicitation of votes from shareholders, bondholders, and others having a stake in governing corporate or mutual fund affairs. More particularly, the present invention pertains to methods and systems for communicating directly with shareholders and other stakeholders about to solicit votes regarding particular corporate affairs, including matters of corporate governance and securities transactions.

Currently, if a corporation or mutual fund issuer of securities wishes to affect the outcome of a vote for its annual or special meeting, they hire agents commonly known as "Solicitors" to contact the company's voters and deliver a message for solicitation purposes. Typically, this contact is initiated by either mail or telephone. Less frequently, the corporate issuer may perform these activities without agents by placing their message on their corporate web site. As an alternative, or to supplement this activity for best results, the corporate or mutual fund issuer will purchase mass media assets (e.g., newspaper ads, radio and/or television time) that they believe will reach and affect the voting position of their target audience, namely their voters. In the case of contested elections, dissident voters will act in the same manner as the corporate issuers in attempting to influence the voters.

Institutional voters may have significant relationships (commercial banking, investment banking or pension fund management) with the companies whose stocks or bonds they hold in their investment portfolios. The 'push' solicitation methodology currently employed, whereby a voter is contacted directly by or on behalf of a corporate issuer, is fraught with potential conflicts of interest. These conflicts can arise because solicitation activity directed at the institutional voter in the traditional fashion opens the possibility that the business interests (either to gain new or retain current business from the company in question) could influence the voting decision.

Other than corporate websites, there are no electronic or Internet-based methods and systems which can act as a "one-way mirror" for information in a 'pull' scenario; that being that the information is available to the voter but is only usable if a deliberate action is taken to retrieve and act upon it in private and without undue influence by the corporate or mutual fund issuer.

Thus, corporations and mutual fund companies have been searching for a solution to the inefficiency and expense associated with postal mail and telephone communications to voters related to meetings, corporate governance, regulatory or compliance matters, mergers, acquisitions, takeovers, written consents, proxy contests, or simply dissemination of information to voters.

SUMMARY OF THE INVENTION

The present invention is directed to a business process using electronic means, to include multiple current and evolving Internet technologies, to provide and disseminate solicitation information on behalf of corporate stock and bond issuers (foreign or domestic) or dissident shareholders for the purpose of affecting the outcome of voting on corporate events, be it proxy voting for annual meetings, special meetings, takeovers, proxy fights or other voting events as defined by the Securities and Exchange Commission (SEC) or equivalent foreign entities. The process and method also includes the electronic delivery of communications that apprise or educate voters of any event or circumstance that may materially affect their investment in the corporation or mutual fund company.

The present invention utilizes the Internet (or similar electronic distribution methodology) as a portal for corporate or mutual fund issuers or their dissident shareholders to submit corporate governance solicitation into the system for viewing by investors or their agents.

The present invention provides a portal for other stock, fund or bondholders, who have received a username and password (or similar), which gives them the opportunity to view and/or listen to the solicitation via the Internet (or similar electronic distribution methodology) in the privacy of their office, home or other location without other direct contact from the issuer or its agents. Such rights to view and/or listen to such material will be granted only to those stock, fund or bondholders who have voting rights for that particular security.

The present invention responds via paper or electronic reports to the corporate or mutual fund issuer showing "up to date" voting results so that the company or fund management can assess the momentum of the vote. This information allows them to be proactive if the vote is going against them by providing additional solicitation material as many investors will change their votes if presented with compelling evidence of a proxy proposal's benefit to them.

The electronic delivery and distribution process and method provides a cost effective, personalized and timely communication via electronic means of text, audio or streaming video messages from corporations and mutual fund companies or other constituents while attending to an important need by voters to maintain their confidentiality as voters and as receiving solicitation.

In one aspect of the invention, a method is provided for the electronic delivery and distribution of a solicitation of votes on shareholder issues from an issuer to voters. The method includes creating an electronic solicitation message for the issuer; tagging the electronic solicitation message with at least one parameter to ensure the electronic solicitation message is available to the voters holding a shareholder position with the issuer; presenting the electronic solicitation message to the voters; recording and compiling a plurality of information regarding each viewing of the transmitted solicitation message; aggregating a plurality of electronic voting results from the voters; and reporting the aggregated electronic voting results to the issuer.

In another aspect of the invention, a system is provided for the electronic delivery and distribution of a solicitation for votes on shareholder issues from an issuer to a plurality of voters. The system includes a proxy voting platform for creating an electronic solicitation message for the issuer, for tagging the electronic solicitation message with at least one parameter to validate that a voter is authorized to receive the electronic message, for presenting the electronic solicitation message to the authorized voters and recording and reporting a plurality of electronic voting results and viewing information for each access to the electronic solicitation message by the voters. This system also includes a user interface to the proxy voting platform that enables the issuer and the authorized voter to access the electronic solicitation message and to receive reports. The system further includes a database for storing a plurality of electronic solicitation messages, electronic voting results, and viewing information.

BRIEF DESCRIPTION OF THE DRAWINGS

These and other advantages and aspects of the present invention will become apparent and more readily appreciated from the following detailed description of the invention taken in conjunction with the accompanying drawings, as follows.

FIG. 8 illustrates a display of a voting screen presented to a system user after the user selects a particular "meeting" link from the meeting list of FIG. 7.

DETAILED DESCRIPTION OF THE INVENTION

Figure 1:
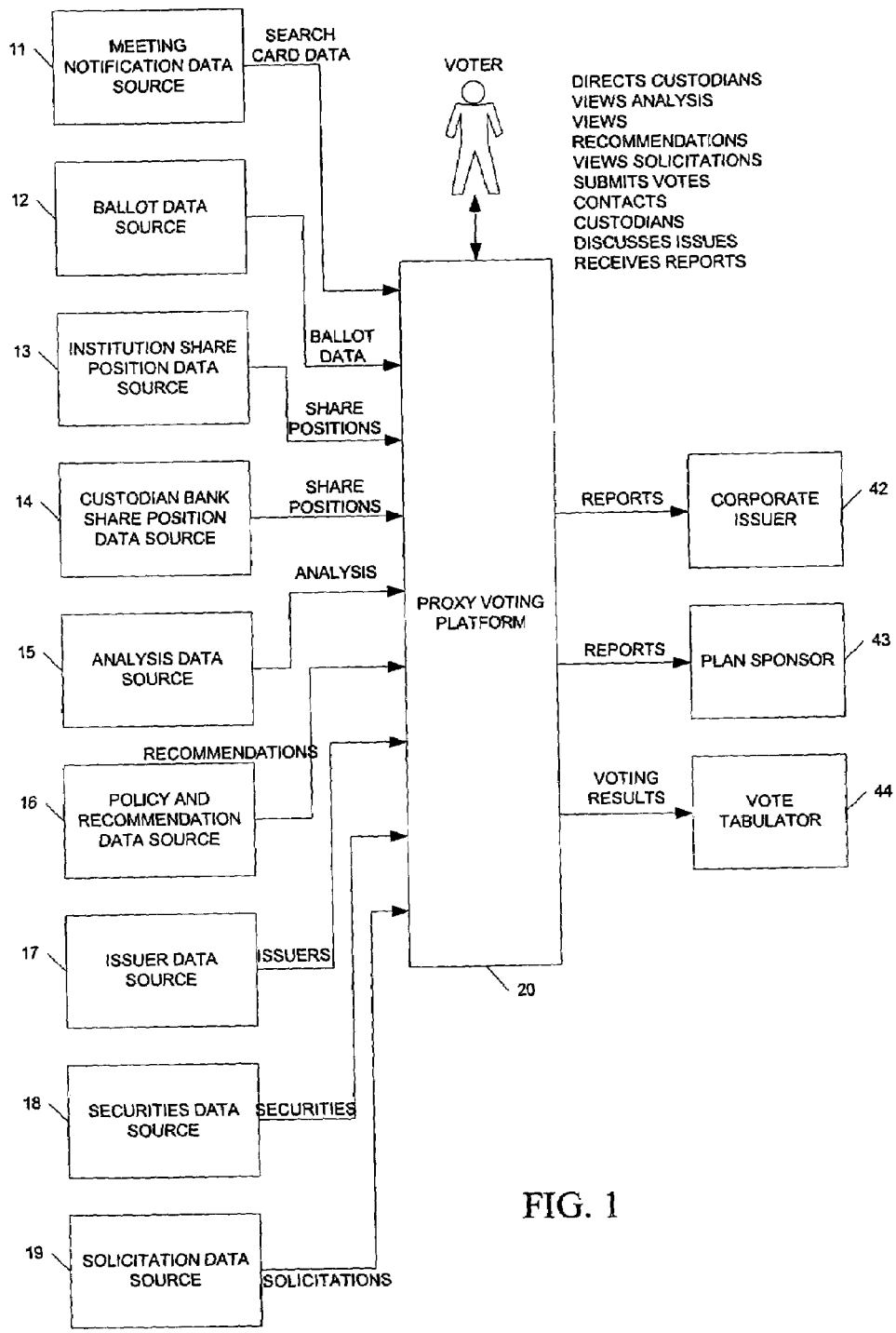
FIG. 1 illustrates a block diagram of the electronic solicitation system in an exemplary embodiment of the present invention.

The following description of the invention is provided as an enabling teaching of the invention and its best, currently known embodiment. Those skilled in the art will recognize that many changes can be made to the embodiments described while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations of the invention are possible and may even be desirable in certain circumstances and are part of the present invention. Thus, the following description is provided as illustrative of the principles of the invention and not in limitation thereof since the scope of the present invention is defined by the claims.

Definitions

Agents—Organizations acting on behalf of corporations, mutual fund companies, custodian banks and brokers, institutions, voters. For example, solicitors and transfer agents act on behalf of corporations and mutual funds or other interested parties such as dissident shareholders or opposition groups while voting agents act on behalf of institutions.

Beneficial Owners—Shareholders and bondholders (voters) who have their stock or bonds held in custody at a Custodian Bank or Brokerage Firm.

Constituents—Any party involved in the process of disseminating corporate communications. This includes corporations, mutual fund companies, institutions, shareholders, bondholders, transfer agents, solicitors, proxy agents, voting agents, proxy advisors, and any other interested party.

Corporation/Corporate Issuer—Publicly-traded corporations and mutual fund companies.

Creator/Message Creator—The creator of a message, which may or may not be the sender. The message creator designs the message in any format, such as text, audio, video, etc.

Electronic Distribution or Delivery of Communication from Management or Other Shareholders—Providing access to electronic text, audio, and/or video content (collectively referred to as "solicitation content") by means of embedding the solicitation content in an electronic proxy ballot, providing one or more links to the solicitation content in an electronic ballot or electronic voting platform, and/or pushing the solicitation content (or links thereto) directly to shareholders or bondholders by electronic mail.

E-Solicitation or Electronic Solicitation—Each and every electronic means of communication concerning the impact of securities, and exchanged between shareholders and/or any party impacted by the value, actions, and results of a corporate action and any corporate issuer and/or any of its subsidiaries, contractors, and/or interested parties that may have interest in the securities of such corporation or mutual fund company. Thus, "electronic solicitation" includes each and every message sent in any form of electronic original format and/or delivery either: (a) from a sender or an agent acting on their behalf (a corporation, mutual fund company or other interested party affected by actions of the corporation or mutual fund company-such as shareholders, bondholders, other companies interested in the value of the corporate issuer securities, etc.; or (b) to a shareholder or bondholder or any other recipient determined by the sender. The purpose of such electronic solicitation can be to provide information, encourage voting, or persuade voting decisions.

Electronic Solicitation Services—The electronic distribution or delivery of communication from corporate management, mutual fund management or other shareholders to shareholders or bondholders for the purpose of soliciting a specific vote result in relation to annual meetings, corporate governance, regulatory or compliance matters, mergers, acquisitions, takeovers, written consents, proxy contests, spin-offs, de-mutualizations or bankruptcies. Electronic Solicitation Services can also encompass any communication to apprise or educate investors about any event or circumstance that may materially affect the company or find.

Issuers—Corporations and Mutual Fund Companies.

Message—Any communication from a message "sender" to a message "recipient."

Message format—Any format other than mail or telephone formats, including video, audio, text, physical, analog, digital, verbal or any other electronic format as well as any future distribution format.

Notification—The actual message to be delivered to the recipient in electronic format and directions for accessing the message.

Plan Sponsor—A shareowner that hires an institution to manage and vote on their behalf. Plan Sponsors will periodically request reports on how the institution has voted.

Recipient—Any constituent determined by the sender to be the receiver of a message and/or access to a message (i.e. shareholders, bondholders, voting agents, proxy advisors, etc.).

Sender—A constituent (e.g., corporations, mutual fund companies, stockholders or bondholders, and/or any other constituent on behalf of stockholders and/or bondholders) or an agent acting on their behalf. The sender shall have the authority to send a message, although it may or may not participate in the creation of the message. The sender may or may not know the identity of all recipients. If not, identity information will be provided to Electronic Solicitation System Provider from other sources such as custodian banks or brokerage firms. (i.e. shareholders who are beneficial owners, registered through a custodian bank).

Solicitation Content—Text, audio, video or other corporate communication from a corporation or mutual fund company, or agent acting on their behalf.

Voter—shareholders and bondholders or their agents voting on their behalf (i.e. voting agents and advisors).

Publicly traded corporations are required by law to hold one meeting per year. This meeting serves the purpose of acquiring shareholder and/or bondholder approval on proposals pertaining to the corporation's management and operations or other corporate actions. Aside from the required annual meeting, corporations also hold other meetings and consent solicitations whenever shareholder and/or bondholder approval is required for additional purposes, i.e. takeovers, proxy fights, etc. Conventionally, the process proceeds as follows: (a) a meeting is set by a corporation or mutual fund company or mandated by another institution in the case of a special/extraordinary meeting; (b) a corporation or mutual fund company, or other interested party, submits filings pertinent to such meeting; (c) a meeting requires votes of shareholders, bondholders, either all types or only a group, as designed by the corporation or mutual fund company or other interested party. Because of the significant economic impact of the voting results, corporations or mutual funds elect to hire special agents in order to facilitate the annual meeting material distribution and voting process.

Figure 2:
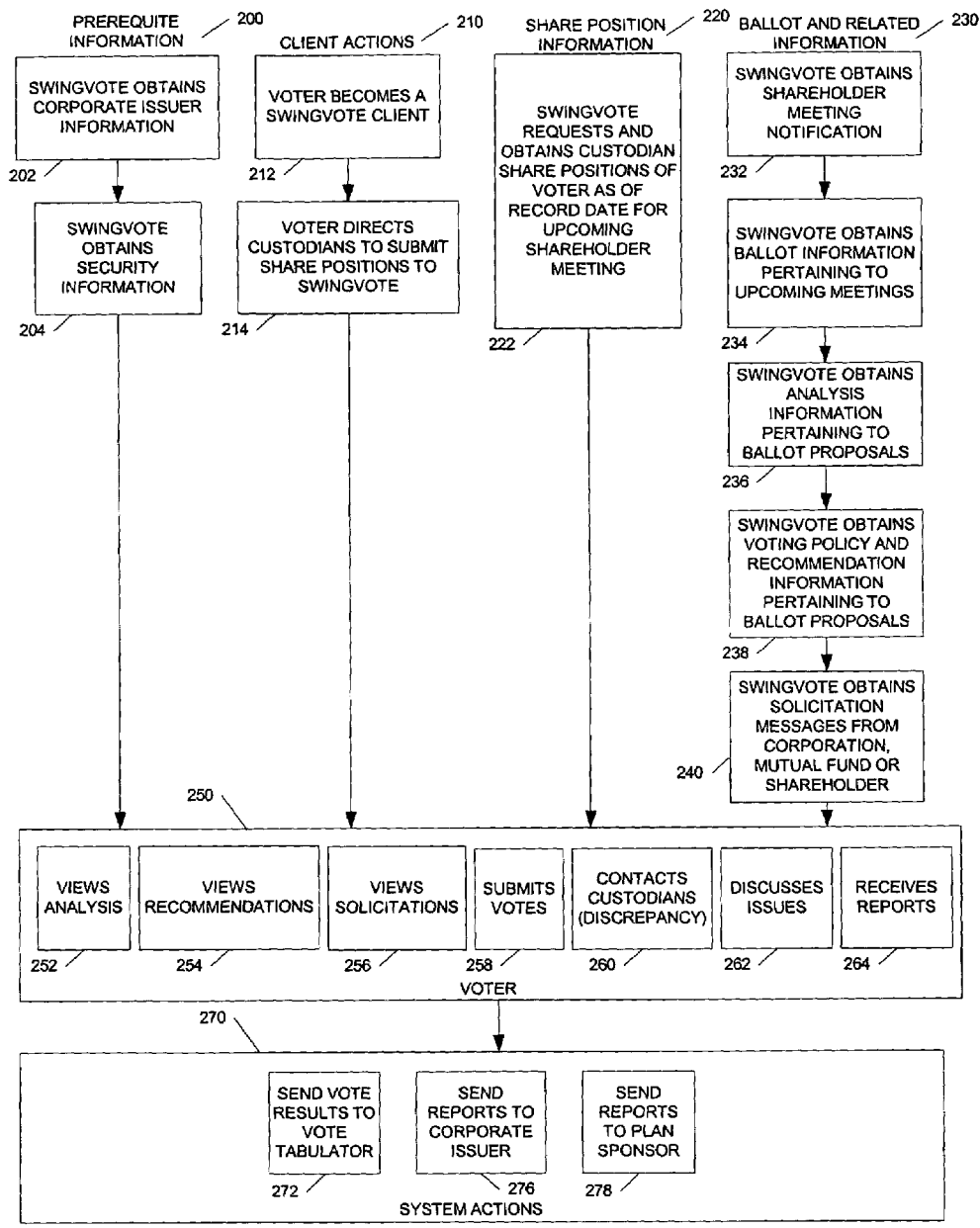
FIG. 2 illustrates a flow diagram representing the overall sequence of process steps and activities in an exemplary embodiment the present invention.
Figure 3:
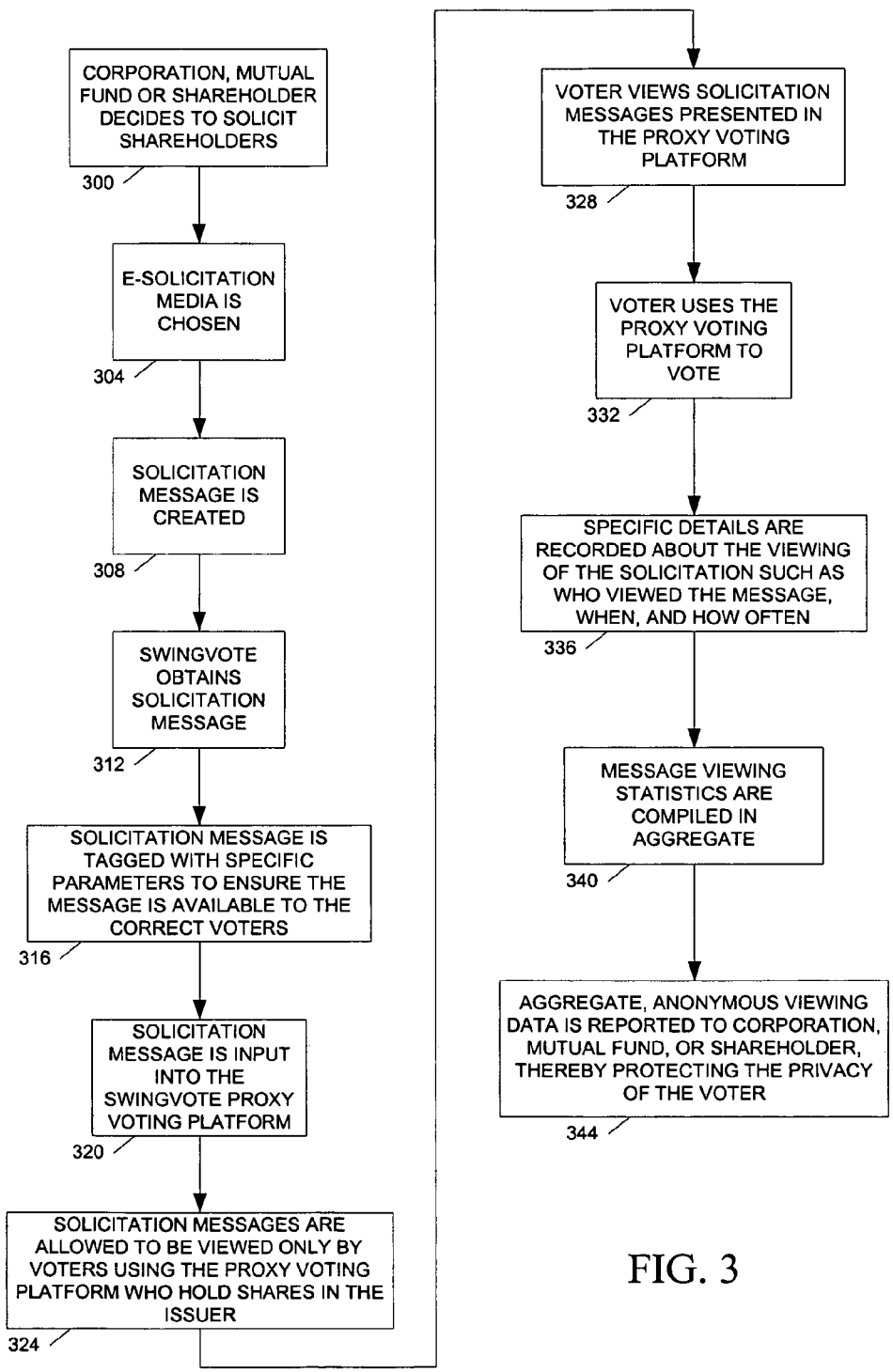
FIG. 3 illustrates a flow diagram of the sequence of steps of the electronic solicitation process in an exemplary embodiment of the present invention.

Referring to FIGS. 1, 2 and 3, a corporation, mutual fund company, and/or any other interested party (i.e., voters interested in shareholder proposals or other corporations in the case of takeover proposal, etc) desires to convince voters to vote either for certain proposal(s), against certain proposal(s), abstain from certain proposal(s), or withhold their votes from certain proposal(s). The corporation also may have an interest in providing additional information about the meeting directly to voters pertinent to that particular meeting and/or in disseminating information about the corporation or mutual fund unrelated to the meeting.

Figure 4:
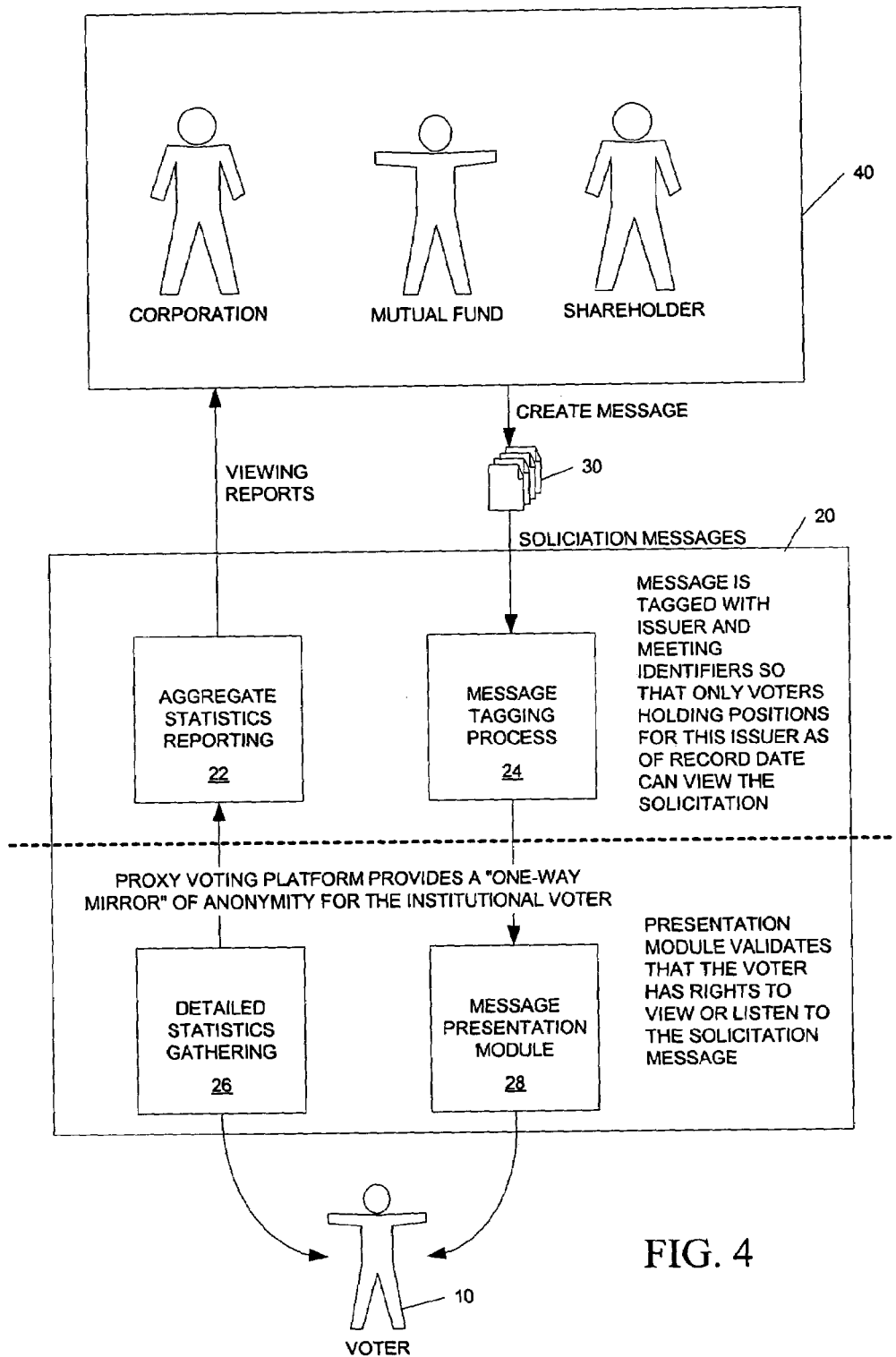
FIG. 4 illustrates a block diagram providing additional functional detail of the software modules and functions of the Proxy Voting Platform in an exemplary embodiment of the present invention.
Figure 5:
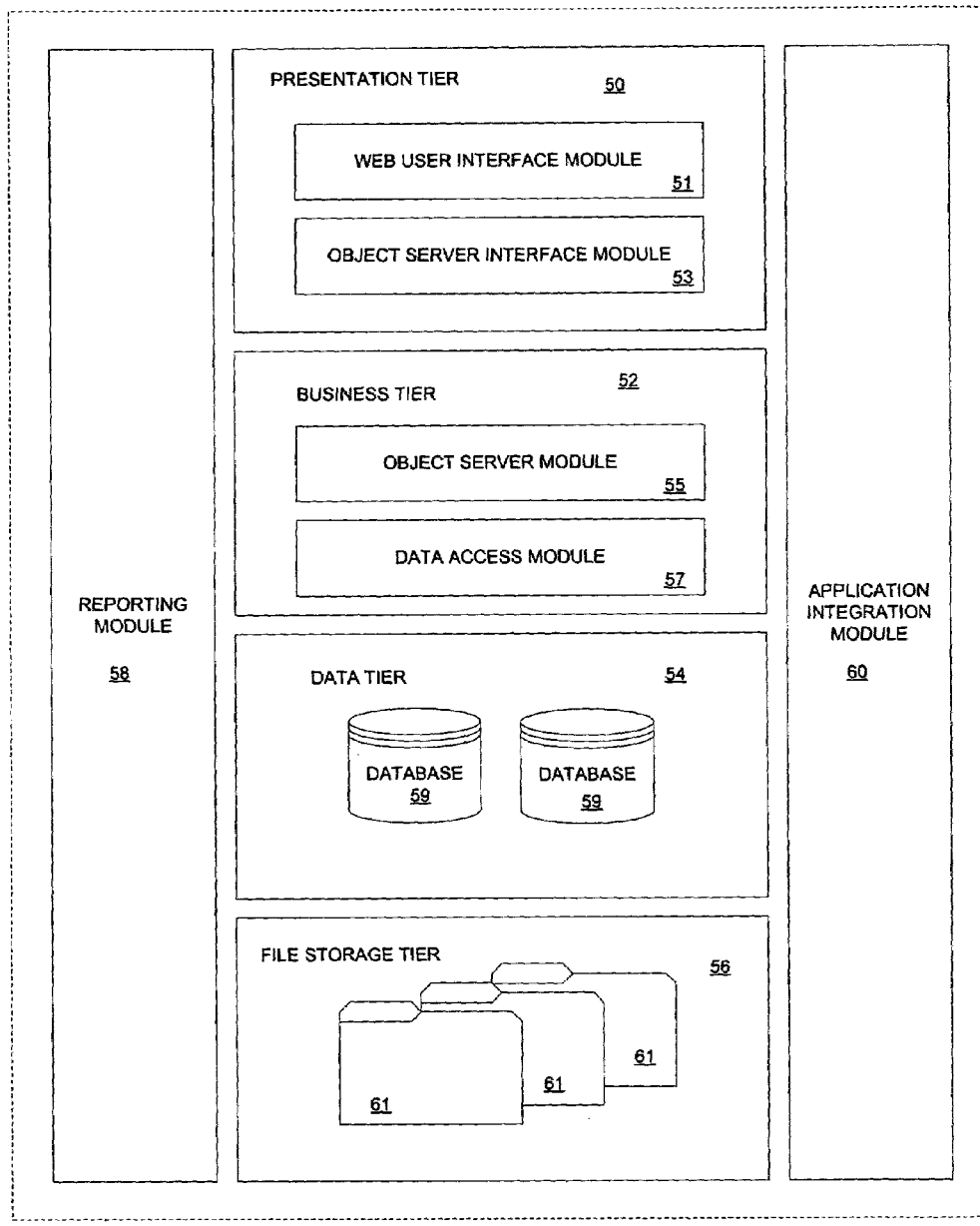
FIG. 5 illustrates a block diagram showing the software modules and components of the Proxy Voting Platform and application in an exemplary embodiment of the present invention.

The core functionality of the system is provided by a Proxy Voting Platform 20 (software) shown generally on FIG. 1 and in more detail on FIGS. 4 and 5. The system can obtain needed data from a variety of data sources, as identified in blocks 11 through 19. In addition to coordinating the delivery and viewing of messages and ballots, the system also uses voting data to assemble and deliver voting results to the Issuer 12, to a corporate plan sponsor 13, and to a vote tabulator 14.

More specifically, as illustrated in FIG. 1, the present invention includes a Proxy Voting Platform 20 that is provided by the Electronic Solicitation System Provider. Data sources 11–19 provide inputs to Proxy Voting Platform 20. The inputs depicted on the input lines include meeting notification data, ballot data, share positions from institutions 13, share positions from custodian banks 14, analysis and recommendations, issuer data, securities data and solicitations. Voter 10 interacts with the Proxy Voting Platform to direct custodians, view the analysis and recommendations, view solicitations, submit votes, contact custodians, discuss issues electronically and receive reports. Outputs from the Proxy Voting Platform include electronic reports sent to the SEC 41, electronic reports sent to the corporate issuer 42, electronic reports sent to the plan sponsor 43, and vote results sent electronically to the vote tabulator 44.

The overall operational sequence of the electronic solicitation process of the present invention is illustrated in FIG. 2. The Electronic Solicitation System Provider (ESSP) gathers information and performs the steps labeled Prerequisite Information 200, Client Actions 210, Share Position Information 220 and Ballot and Related Information 230. Prerequisite information 200 includes the steps of obtaining corporate issuer information 202 and obtaining securities information 204. Client actions 210 includes the voter becoming a client of the ESSP (i.e., SwingVote in the figure) in step 212, and the voter directing custodians to submit share positions to the ESSP in step 214. Share position information 220 includes the ESSP requesting and obtaining custodian share positions of voters as of the record date for upcoming shareholder meetings in step 222. Ballot and related information includes the steps 232–240 shown in FIG. 2. The ESSP obtains shareholder meeting notification data in step 232. Ballot information pertaining to upcoming meetings is obtained in step 234. The ESSP obtains analysis information pertaining to ballot proposals in step 236. The ESSP obtains voting policy and recommendation information pertaining to ballot proposals in step 238. The ESSP obtains solicitation messages from a corporation, mutual fund or shareholder in step 240.

The voter performs the steps illustrated in block 250. The voter views analysis in step 252, views recommendations in step 254, views solicitations in step 256, submits votes in step 258, contacts custodians in the event of a discrepancy in step 260, discusses issues 262 via the Proxy Voting platform and receives reports 264 via the Proxy Voting Platform, The ESSP, through the medium of the Proxy Voting Platform, performs the steps illustrated in block 270. The ESSP send the vote results to a vote tabulator in step 272, send reports to the SEC in step 274, sends reports to the corporate issuer in step 276 and sends reports to the Plan Sponsor in step 278.

FIG. 3 illustrates a flow diagram of the sequence of steps of the electronic solicitation process. In logic block 300, a corporation, mutual find or a shareholder makes a decision to solicit shareholders in regards to a voting event. This is followed in logic block 304 with the selection of the ESSP for electronic solicitation services. A solicitation message is then created in logic block 308 and received by the ESSP in logic block 312. The ESSP tags solicitation messages with specific parameters to ensure the message is available to the correct voters in logic block 316. The solicitation messages are then input into the ESSP Proxy Voting platform in logic block 320. The solicitation messages are allowed to be viewed only by the voters using the Proxy Voting Platform holding shares in the Issuer as indicated in logic block 324.

The voter views the solicitation message as presented in the Proxy Voting Platform as indicated in logic block 328. This is followed with the voter using the Proxy Voting platform to vote as indicated in logic block 332. The ESSP records specific details concerning the viewing of the electronic solicitation message as indicated in logic block 336. The Proxy Voting Platform compiles message viewing statistics in aggregate in logic block 340. Aggregated, anonymous viewing data is then reported by the ESSP Proxy Voting Platform to the corporation, mutual fund or shareholder while protecting the privacy of the voter. This final process is indicated in logic block 344.

In accordance with one aspect of the present invention, and as used in the electronic solicitation process of FIG. 3, the constituent attempting to reach voters and/or other interested parties about the corporation decides to deliver a message via electronic solicitation, thus becoming a Sender. Then, a message is created in any format (voice, audio, video, text, etc.) by the message Creator. The Creator may or may not be also the Sender. The Sender shall have the authority to send a message although it had no participation in the creation of the message).

The Sender or message Creator, acting on behalf of the sender, sends the message to the Electronic Solicitation System Provider (sometimes referred to herein and in the drawings as "Swingvote") via any message format. Alternatively, the Electronic Solicitation System Provider retrieves such message from the Sender or Creator, along with recipient e-mail addresses, if necessary. The Sender or Creator may or may not supply the Electronic Solicitation System Provider with the necessary address and additional information to reach the Recipients via electronic delivery. The Electronic Solicitation System Provider receives the message and either transforms the original message into an electronic format or maintains the message in its original format.

Next, the Electronic Solicitation System Provider transmits the message electronically to the recipient group desired by the Sender, and/or the Electronic Solicitation System Provider makes the message available to be retrieved by the Recipients via electronic notification of the availability of such message.

The Electronic Solicitation System Provider invoices the Sender for messages sent and realizes proceeds from the remittance of message and not for the delivery of such.

The message may or may not be retrieved by the Recipient. For every recipient successfully receiving the message and/or notification by Electronic Solicitation System Provider of the existence and availability of this message, the recipient can choose whether or not to read, view or listen to the message. Additionally, the recipient has a choice of whether or not to act upon receiving the message.

FIG. 4 illustrates, in block diagram form, additional functional details of the software modules and functions of the Proxy Voting Platform. Constituents, represented by block 40, use the Proxy Voting Platform (block 20) to reach voters 10 with messages 30. Electronic solicitation messages are generated by the Proxy Voting Platform 20 and aggregated statistical data on voting results are reported to the constituent 40. The Proxy Voting Platform modules include, but are not limited to, message tagging module 24, message presentation module 28, detailed statistics gathering module 26 and aggregate statistics reporting module 22.

The message tagging module 24 tags each message with issuer and meeting identifiers. This enables only those voters holding positions for the issuer as of the record date to view the electronic solicitation. The dashed line in Proxy Voting Platform block 20 represents the "one-way mirror" that shields the identity of the voter 10 from the constituents 40. Message presentation module 28 validates the right of the voter to view or listen to the electronic solicitation message. Detailed statistics gathering module 26 processes the votes for each voter. The voting results are accumulated by aggregated statistics reporting module 22 which send reports electronically to the constituents 40.

Figure 6:
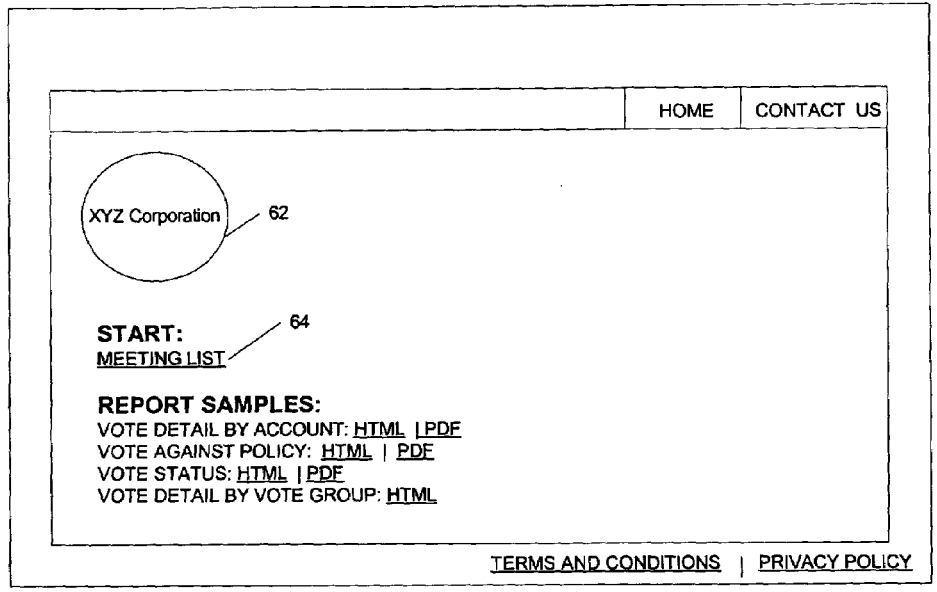
FIG. 6 illustrates a display of the initial screen presented to a user after system login in an exemplary embodiment of the present invention.
Figure 7:
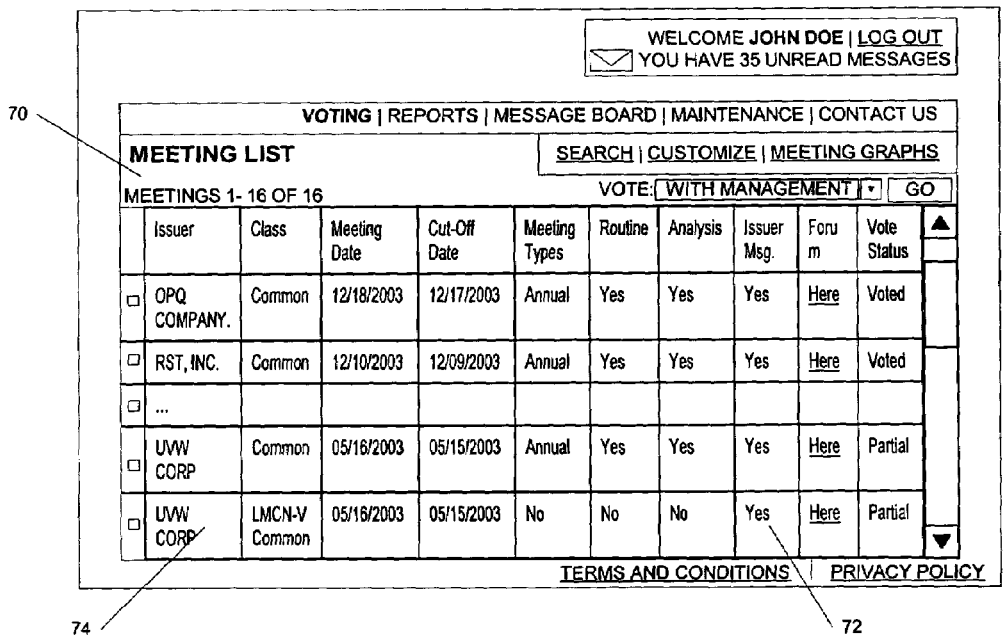
FIG. 7 illustrates a display of a meeting list screen presented to a system user after the user selects the "meeting list" link on the screen of FIG. 6.

A voter 10 who wants to view the solicitation message connects to the system using a log-in screen at a web page maintained by the Electronic Solicitation System Provider. After the user presents proper log-in credentials, the user is presented with a system start screen 62 as shown on FIG. 6. When the user selects the "Meeting List" link 64 on FIG. 6, a list of one or more "meetings" associated with one or more corporate matters in which that user has ownership is presented to the user as illustrated in FIG. 7.

Figure 9:
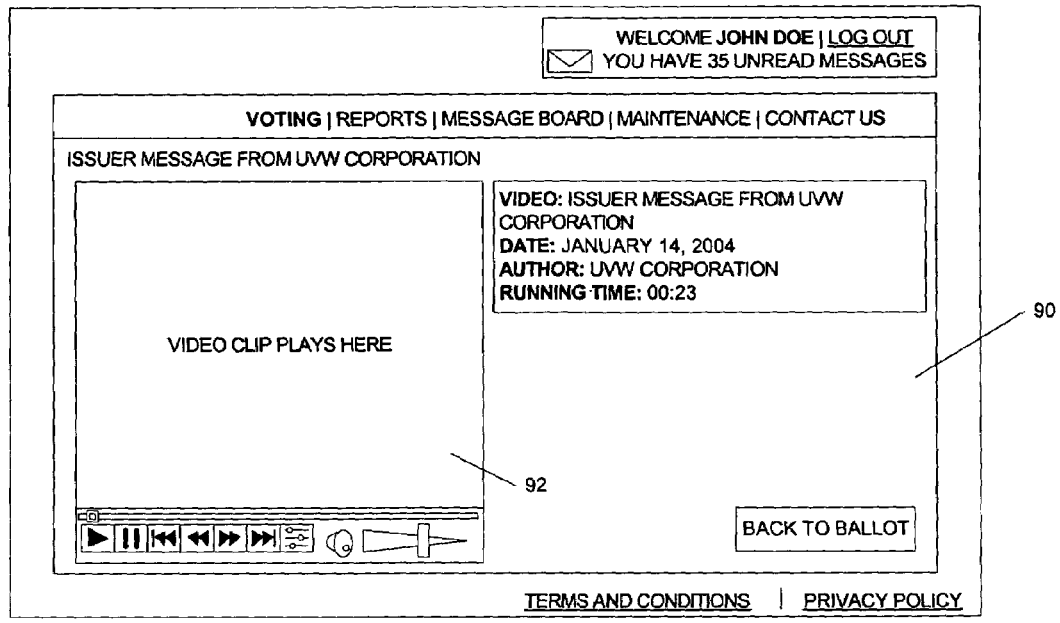
FIG. 9 illustrates a display of a video issuer message screen presented to a system user after the user selects the "Issuer Message" link on the voting screen of FIG. 8.
Figure 10:
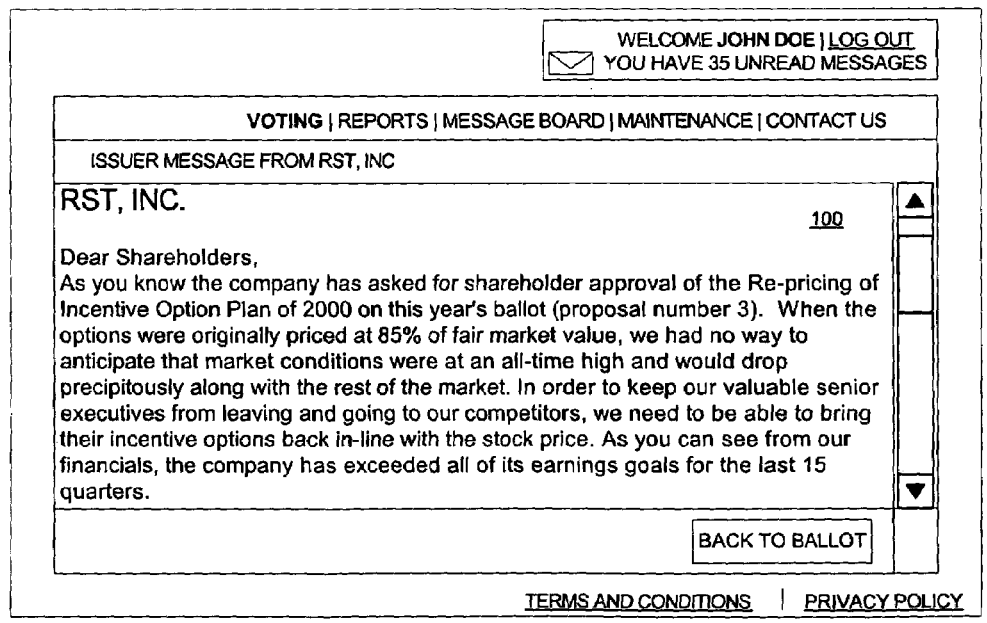
FIG. 10 illustrates a display of a text issuer message screen presented to a system user after the user selects the "Issuer Message" link on the voting screen of FIG. 8.

Preferably, the message will contain a link to a solicitation message from the Sender. The availability of a solicitation message is indicated on the Meeting List display 70 of FIG. 7. The user can also select the name of the "Issuer" 74 on the Meeting List display 70 of FIG. 7, which will then take the user to the electronic ballot page for that particular meeting. One example of such a ballot page 80 is shown in FIG. 8, wherein the meeting and ballot pertains to the election of board of directors. While viewing the ballot page 80 of FIG. 8, the user can select the "Issuer Message" link 82. This link will take the user to a audio or video issuer solicitation message 92 displayed in a window on Issuer message display 90 of FIG. 9 or to a text message on the issuer message display 100 of FIG. 10. Before or after viewing an issuer solicitation message, the user can vote on the issue in question directly on the electronic ballot page display 80 of FIG. 8.

FIG. 5 illustrates an exemplary embodiment of the Proxy Voting Platform application and software as used in the present invention. Because the system is web-based application, conventional "n-tier" architecture is used, including a presentation tier 50, business tier 52, data tier 54, and file storage tier 56. N-tier software architecture is well known to those skilled in the art of computer programming and will not be discussed in any detail herein. Presentation tier 50 includes, but is not limited to, web user interface module 51 and object server module 53. Business tier 52 includes, but is not limited to, object server module 55 and data access module 57 for accessing data stored in databases in the data tier 54. The data tier 54 includes a plurality of databases 59. File storage tier 56 includes a plurality of data files 61. The Proxy Voting Platform also includes application integration module 60 and reporting module 58.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the exemplary embodiment are possible without departing from the spirit and scope of the present invention. In addition, it is possible to use some of the features of the present invention without the corresponding use of the other features. Accordingly, the foregoing description of the exemplary embodiment is provided for the purpose of illustrating the principles of the present invention and not in limitation thereof since the scope of the present invention is defined solely by the appended claims.

What is claimed is:

1. A method for the electronic delivery and distribution of a solicitation for votes on shareholder issues from an issuer or authorized party to a plurality of voters comprising the steps of:
   creating an electronic solicitation message wherein the electronic solicitation message includes an electronic proxy ballot and a solicitation content;
   tagging the electronic solicitation message with at least one parameter to ensure the electronic solicitation message is available to the voters holding a shareholder position with the issuer;
   presenting the electronic solicitation message to the voters;
   enabling the voters to view the solicitation content anonymously:
   recording and compiling a plurality of information regarding each confidential viewing of the transmitted electronic solicitation message by the voters;
   aggregating a plurality of confidential electronic voting results received from the voters; and
   reporting the aggregated electronic voting results to the issuer or authorized party.

2. The method for the electronic delivery and distribution of claim 1 further comprising the steps of obtaining a plurality of corporate and securities information.

3. The method for the electronic delivery and distribution of claim 1 wherein the solicitation content is embedded in the electronic proxy ballot.

4. The method for the electronic delivery and distribution of claim 1 wherein the electronic solicitation message includes a link to a solicitation content.

5. The method for the electronic delivery and distribution of claim 1 wherein the solicitation content comprises at least one of a video communication, an audio communication, and a text communication from the issuer or authorized party.

6. The method for the electronic delivery and distribution of claim 1 further comprising the step of transmitting the voting results to a vote tabulator.

7. The method for the electronic delivery and distribution of claim 1 further comprising the step of transmitting the voting results to a plan sponsor.

8. The method for the electronic delivery and distribution of claim 1 further comprising the step of transmitting the voting results to a government agency.

9. The method for the electronic delivery and distribution of claim 1 wherein the step of presenting the electronic solicitation message comprises transmitting a notification of the solicitation message to the voters and validating that each voter receiving the notification is authorized to view the solicitation message.

10. The method for the electronic delivery and distribution of claim 1 further comprising the steps of receiving analysis information and voting policy recommendations relating to a proposal on an electronic proxy ballot and providing the received information and policy recommendations to the voters electronically.

11. The method for the electronic delivery and distribution of claim 1 wherein the authorized party includes a dissident shareholder or any party authorized by a government agency.

12. A system for the electronic delivery and distribution of a solicitation for votes on shareholder issues from an issuer or authorized party to a plurality of voters comprising:
   a proxy voting platform for creating an electronic solicitation message wherein the electronic solicitation message includes an electronic proxy ballot and a solicitation content, for tagging the electronic solicitation message with at least one parameter to validate that a voter is authorized to receive the electronic message, for presenting the electronic solicitation message to the authorized voters and recording and reporting a plurality of confidential electronic voting results and viewing information for each confidential access to the electronic solicitation message by the voters;
   a user interface to the proxy voting platform that enables each authorized voter to access the electronic solicitation content anonymously; and
   a database for storing a plurality of electronic solicitation messages, electronic voting results and viewing information.

13. The system for the electronic delivery and distribution of claim 12 wherein the database stores a plurality of ballot data, share position information, ballot proposal analysis information, voting policy recommendations, and issuer and securities information.

14. The system for the electronic delivery and distribution of claim 12 wherein the proxy voting platform further comprises a plurality of modules for tagging and presenting the electronic solicitation message to the voters.

15. The system for the electronic delivery and distribution of claim 12 wherein the proxy voting platform further comprises a detailed statistics module for gathering the electronic voting results from each authorized voter.

16. The system for the electronic delivery and distribution of claim 12 wherein the proxy voting platform further comprises an aggregate statistics reporting module that accumulates electronic voting results from the plurality of voters and provides the aggregated electronic voting results to the issuer or authorized party.

17. The system for the electronic delivery and distribution of claim 12 wherein the solicitation content comprises at least one of a video communication, an audio communication, and a text communication from the issuer.

18. The system for the electronic delivery and distribution of claim 12 wherein the authorized party includes a dissident shareholder or any party authorized by a government agency.

19. A computer program product for enabling an electronic delivery and distribution of a solicitation for votes on shareholder issues from an issuer or authorized party to a plurality of voters, comprising a computer readable medium having computer readable code embedded therein, the computer readable medium comprising:
   program instructions that enable creation of an electronic solicitation message wherein the electronic solicitation message includes an electronic proxy ballot and a solicitation content;
   program instructions that tag the electronic solicitation message with at least one parameter to ensure that the electronic solicitation message is available to the voters holding a shareholder position with the issuer;
   program instructions that present electronic solicitation messages to the voters;

program instructions that enable the voters to view the solicitation content anonymously;

program instructions that record and compile a plurality of information regarding each confidential viewing of the transmitted electronic solicitation message by the voters;

program instructions that aggregate a plurality of confidential electronic voting results received from the voters; and program instructions that report the aggregated electronic voting results to the issuer or authorized party.

20. The computer program product of claim 19 wherein the program instructions that present the electronic solicitation message comprise program instructions that transmit a notification of the solicitation message to the voters, and program instructions that validate that each voter receiving the notification is authorized to view the solicitation message.

21. The computer program product for the electronic delivery and distribution of claim 19 wherein the authorized party includes a dissident shareholder or any party authorized by a government agency.

22. The computer program product for the electronic delivery and distribution of claim 19 wherein the computer readable medium is hosted on a proxy platform.

* * * * *